United States Patent
Reznik et al.

(10) Patent No.: US 7,036,653 B2
(45) Date of Patent: May 2, 2006

(54) LOAD MANIPULATION SYSTEM

(75) Inventors: Dan Reznik, Berkeley, CA (US); Florian Hormann, Markt Indersdorf (DE)

(73) Assignee: Siemens Technology-To-Business Center LLC, Berkeley, CA (US)

(*) Notice: Subject to any disclaimer, the term of this patent is extended or adjusted under 35 U.S.C. 154(b) by 252 days.

(21) Appl. No.: 10/207,680

(22) Filed: Jul. 29, 2002

(65) Prior Publication Data

US 2003/0141169 A1 Jul. 31, 2003

Related U.S. Application Data

(60) Provisional application No. 60/353,082, filed on Jan. 29, 2002.

(51) Int. Cl.
 *B65G 43/08* (2006.01)

(52) U.S. Cl. ..................................................... 198/401
(58) Field of Classification Search ................. 198/411, 198/414, 400, 456, 597, 446, 409, 401
See application file for complete search history.

(56) References Cited

U.S. PATENT DOCUMENTS

| | | | |
|---|---|---|---|
| 3,604,551 A | 9/1971 | Fink | |
| 3,617,033 A | 11/1971 | Ichikawa et al. | |
| 3,841,461 A | 10/1974 | Henderson et al. | |
| 3,917,050 A | 11/1975 | Gregor | |
| 4,000,492 A | 12/1976 | Willens | |
| 4,039,074 A | 8/1977 | Maxted | |
| 4,180,943 A | 1/1980 | Smith et al. | |
| 4,634,328 A | 1/1987 | Carrell | |
| 4,944,381 A | 7/1990 | Riley | |
| 5,147,023 A | 9/1992 | Meindl | |
| 5,165,520 A | 11/1992 | Hervé et al. | |
| 5,222,586 A | 6/1993 | Ydoate et al. | |
| 5,372,238 A | 12/1994 | Bonnet | |
| 5,393,937 A | 2/1995 | Etherington et al. | |
| 5,443,791 A | 8/1995 | Cathcart et al. | |

(Continued)

FOREIGN PATENT DOCUMENTS

| | | |
|---|---|---|
| DE | 31 39 279 A1 | 10/1981 |
| DE | 32 41 145 A1 | 11/1982 |
| EP | 0 463 878 A1 | 1/1992 |
| EP | 0 673 138 A2 | 9/1995 |
| GB | 1 465 430 | 2/1977 |
| GB | 2 259 900 A | 3/1993 |
| GB | 2 312 592 A | 10/1997 |
| WO | WO 98/17048 | 4/1998 |
| WO | WO 00/76887 A1 | 12/2000 |

OTHER PUBLICATIONS

Cells in Frames: ATM Over Legacy Networks; Melinda Shore, Joy Veronneau, Tom Parker, Dick Cogger; shore@nr–atp.cit.cornell.edu; 110 Maple Avenue, Ithaca, New York 14850; 5 pages total.

Dan Reznik and John Canny, "The Coulomb Pump: a Novel Parts Feeding Method using a Horizontally–Vibrating Surface" EECS Dept., UC–Berkeley, CA.

Jonathan E. Luntz, William Messner, and Howie Choset, "Parcel Manipulation and Dynamics with a Distributed Actuator Array: The Virtual Vehicle", Department of Mechanical Engineering, Carnegie Mellon University, Pittsburgh, PA 15213.

*Primary Examiner*—Richard Ridley

(57) ABSTRACT

A load manipulation system includes a plurality of cells arranged to form a generally planar load manipulation surface. Each cell has at least one actuator coupled to an upper surface which forms the load manipulation surface. The actuator is operable to vibrate the upper surface of the cell within a plane of the load manipulation surface. The system further includes a controller operable to receive input from a sensor and send commands to the actuators to manipulate loads on the load manipulation surface.

33 Claims, 9 Drawing Sheets

U.S. PATENT DOCUMENTS

| | | |
|---|---|---|
| 5,529,756 A | 6/1996 | Brennan |
| 5,638,938 A | 6/1997 | Lazzarotti et al. |
| 5,769,204 A | 6/1998 | Okada et al. |
| 6,027,694 A | 2/2000 | Boulton et al. |
| 6,189,677 B1 | 2/2001 | Ruf et al. |
| 6,250,707 B1 | 6/2001 | Dintner et al. |
| 6,259,967 B1 | 7/2001 | Hartlepp et al. |
| 6,264,891 B1 | 7/2001 | Heyneker et al. |
| 2002/0005333 A1 | 1/2002 | Mondie et al. |

LOAD MANIPULATION SYSTEM

CROSS-REFERENCE TO RELATED APPLICATION

The present application claims priority from commonly owned U.S. Provisional patent application No. 60/353,082 filed Jan. 29, 2002.

BACKGROUND OF THE INVENTION

The present invention relates generally to load manipulation systems, and more particularly, to a load manipulation system having an array of horizontally vibrating tiles.

Load manipulation devices are used for moving and positioning loads such as parcels, cartons, packages, or industrial parts. These devices may be used, for example, by mail processors, package handlers, or manufacturers. Conventional load manipulation devices include conveyor belts and robotic manipulators. Conveyor belts are well suited for moving large objects over long distances but lack the ability to displace objects in multiple directions and to orient objects. Robotic manipulators are able to precisely position and orient objects but are limited by strength, reach, and the need for large unobstructed workspaces.

Programmable load manipulation by an array of actuators has been proposed to overcome some of these drawbacks. United Kingdom Patent Application No. 2,259,900 describes a hardware platform comprising a set of transfer stations juxtaposed to form a matrix. The matrix is composed of identical platforms of a regular shape (e.g., triangular, square). Each platform contains the appropriate load-motion hardware such as a roller, a conveyor belt, and multi-directional (i.e., horizontally and vertically) vibrating surfaces. The disclosed systems have numerous disadvantages. For example, the required hardware for each platform is complex (e.g., multiple degrees of motion freedom required) and expensive to build and maintain. The system's reliance on bearings reduces the system's expected operating life, since bearings (sliding surfaces) wear easily under repetitive motion. Moreover, platforms based on a vibrating surface configuration require simultaneous vertical and horizontal vibration which requires driving hardware to achieve vibration in two planes. In particular, driving a surface vertically requires an amount of energy which increases with the load weight.

Load manipulation with an actuator array is also disclosed in Parcel Manipulation and Dynamics with a Distributed Actuator Array: The Virtual Vehicle (J. E. Luntz, W. Messner, and H. Choset, Proc. IEEE Int. Conf. on Robotics and Automation (ICRA), pages 1541–1546, Albuquerque, N. Mex., April 1997) (hereinafter "Luntz et al."). Luntz et al. disclose an array of cells consisting of a pair of orthogonally oriented motorized roller wheels. Each wheel is driven through a gear reduction by a DC motor. The system requires expensive actuators with rotational speeds that must be accurately controlled electronically. Because rolling involves both static and sliding friction, it also introduces an added complexity of control in manipulating loads precisely. Another drawback of this system is that rollers do not pack together well, leaving large gaps exist between adjacent rollers which can lead to jamming and the accumulation of loose particles inside of the array.

SUMMARY OF THE INVENTION

A planar load manipulation system of the present invention includes a plurality of cells arranged to form a generally planar load manipulation surface. Each cell has at least one actuator coupled to an upper surface which forms the load manipulation surface. The actuator is operable to vibrate the upper surface of the cell within a plane of the load manipulation surface. The system further includes a controller operable to receive input from a sensor and send commands to the actuators to manipulate loads on the load manipulation surface.

The actuator is disposed below the upper vibrating surface. In one embodiment, the actuator is a speaker and the sensor is a camera coupled to an image processing system.

The above is a brief description of some embodiments of the present invention. Other features, advantages, and embodiments of the invention will be apparent to those skilled in the art from the following description, drawings, and claims. Corresponding reference characters indicate corresponding parts throughout the several views of the drawings.

DETAILED DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
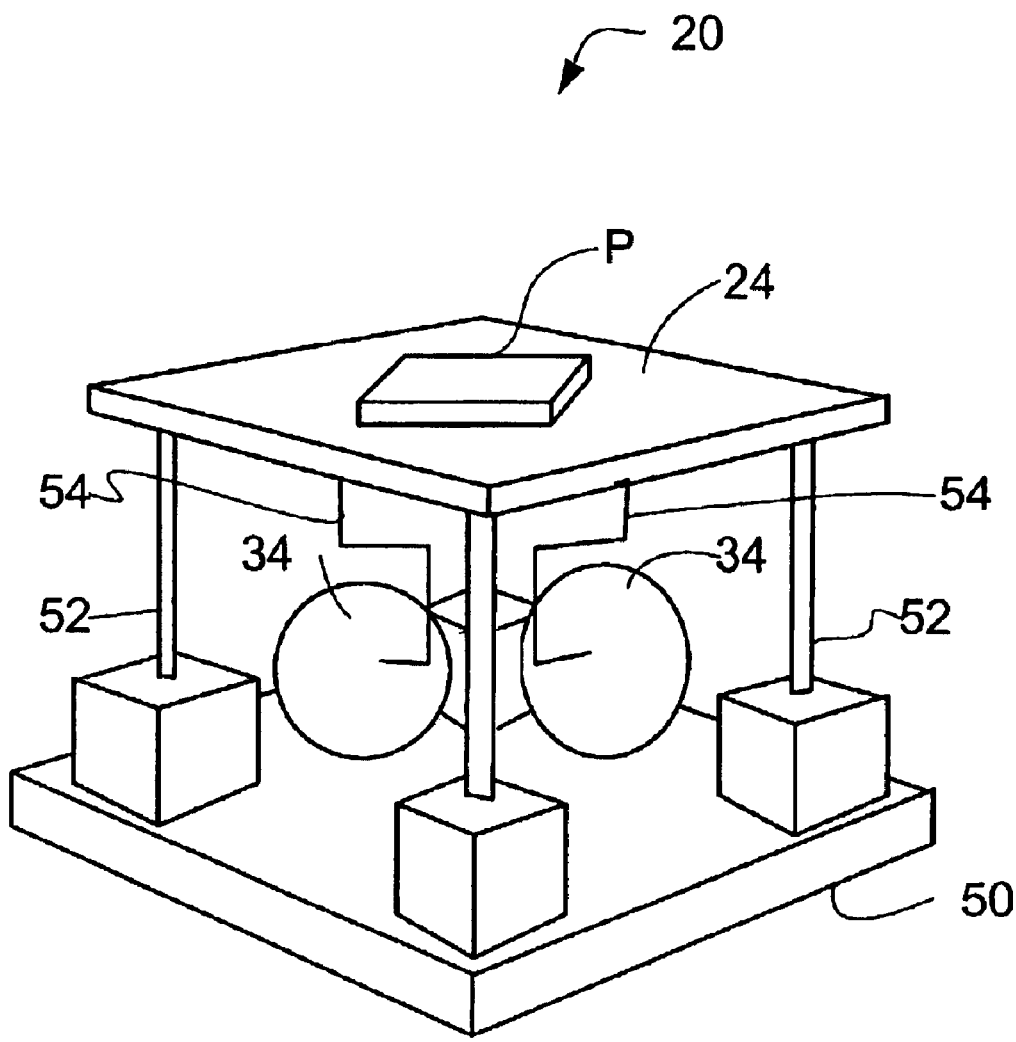
FIG. 1 is a schematic of a cell of a load manipulation system array, according to a specific embodiment of the present invention.
Figure 2:
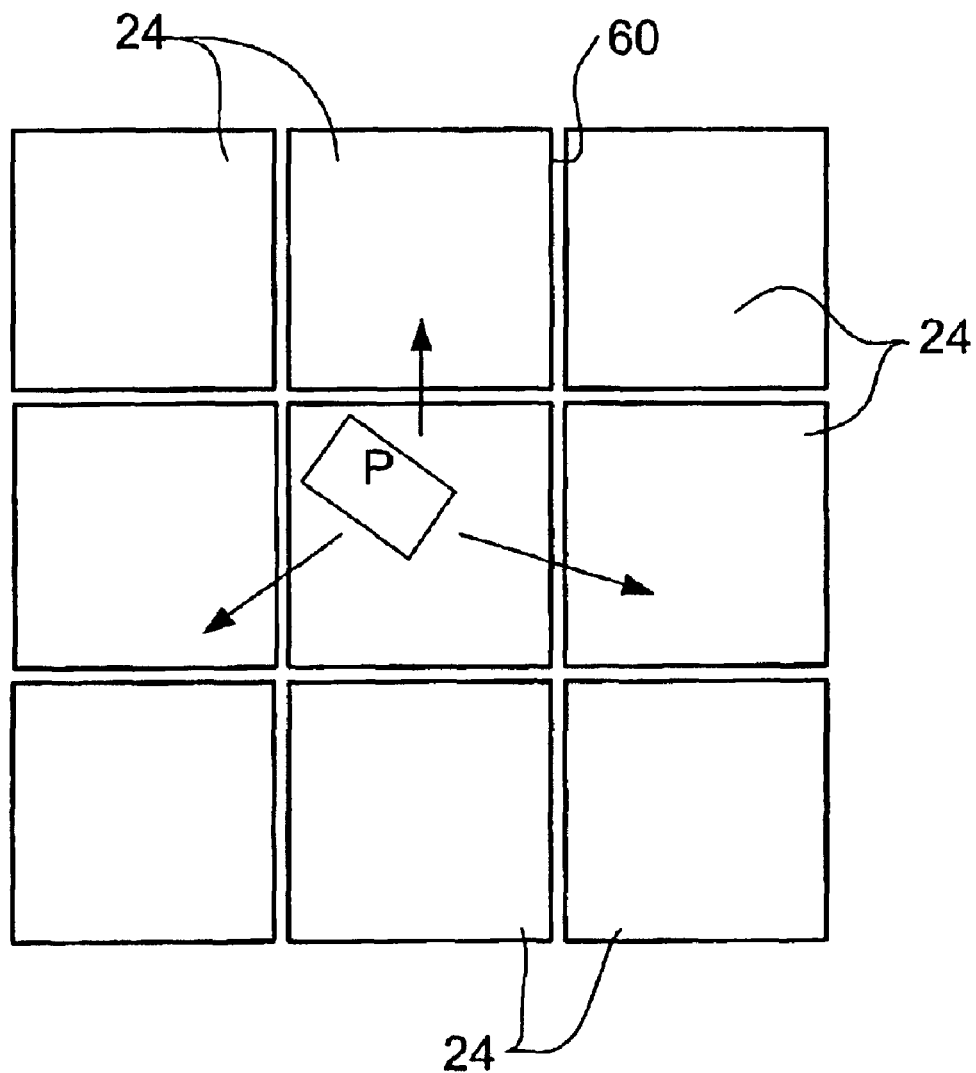
FIG. 2 is a top view of an array of load manipulation cells of FIG. 1 illustrating movement of a load over the array.

Referring now to the drawings, and first to FIG. 1, a cell of a load manipulation system of the present invention is shown and generally indicated at 20. The system provides manipulation (displacement along programmable direction and rotation) of loads P such as parcels, cartons, packages, or industrial parts. As shown in FIG. 2, a plurality of cells 20 are juxtaposed to form a load manipulation surface. Each cell 20 includes an upper surface 24 configured for supporting a load P and horizontally vibrating to transfer the load from the upper surface of one cell to the upper surface of one or more adjacent cells. The number and size of the cells 20 may vary depending on the application and size and type of loads that the system is configured to manipulate. The system allows for complex rearrangement of loads in accordance with a desired manipulation function. Examples of such functions include automated singulation, presentation, and sorting of loads. The system may be used, for example, for load singulation as described in U.S. Patent Application Ser. No. 10/208,703 entitled Load Singulation System and Method, by Dan Reznik et al., filed concurrently herewith, which is incorporated herein by reference in its entirety. As described below, the vibratory motion of the upper surface 24 is in one plane and driven by self-contained actuators (force transducers) and a flexure-based or direct-drive transmission.

Figure 3:
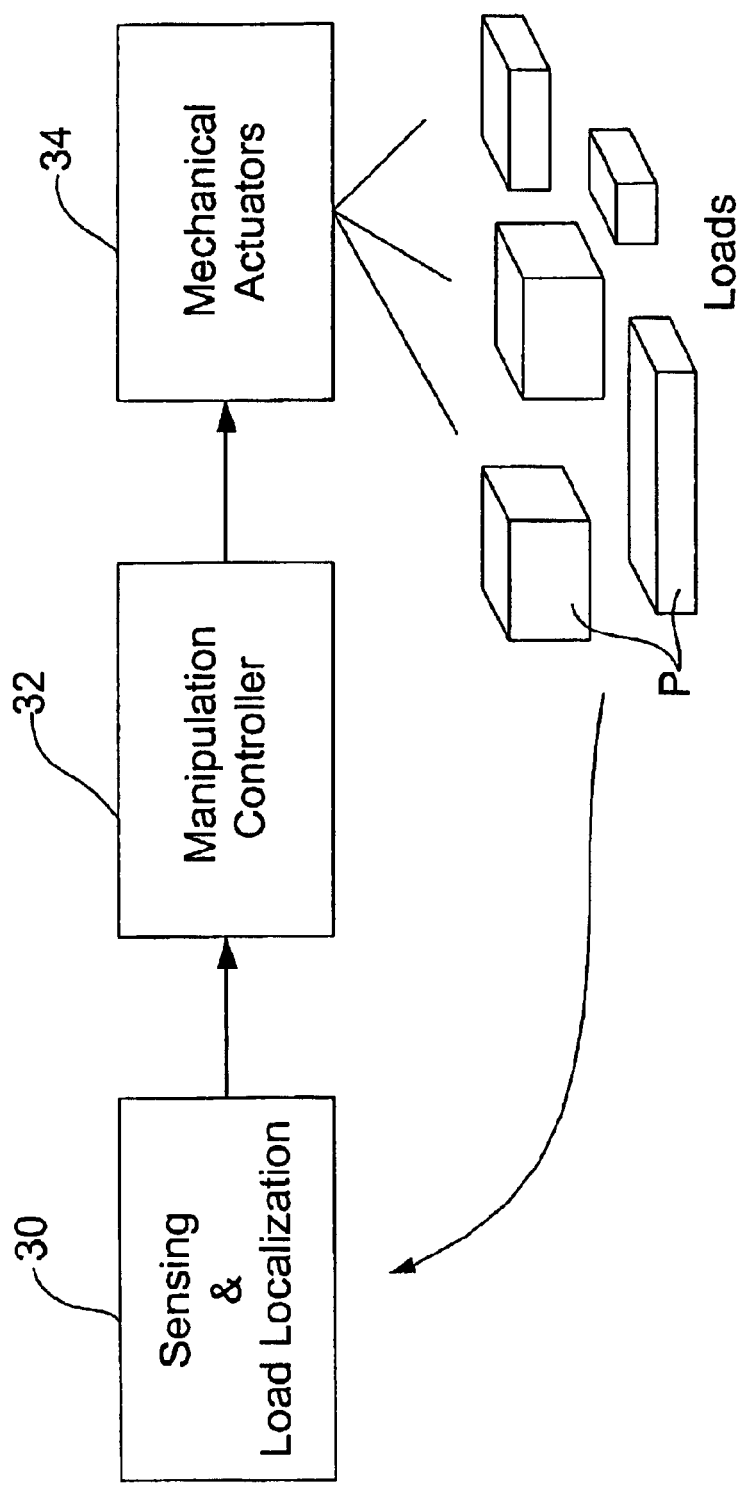
FIG. 3 is a general block diagram of the load manipulation system of the present invention.

A block diagram illustrating feedback and control of the load manipulation system is shown in FIG. 3. A sensing and load localization module 30 sends information about positions of the loads P to a manipulation controller 32 which sends commands to actuators 34. The actuators move the upper surfaces 24 and cause displacement of loads P positioned on the upper surfaces of the cells 20. The sensing module 30 may be an imaging device such as a camera or a pressure sensitive transducer embedded onto the upper vibrating surface 24 or in the actuator or transmission of each cell 20, for example. Each cell 20 receives both power and data commands from a controlling computer. Each cell 20 is preferably responsible for computer interfacing, self-calibration, and signal generation and amplification according to the desired data. In a preferred embodiment, each cell 20 is hardwired with a unique number identifier and all cells receive data information from the same serial (or wireless) bus, such as RS485 (serial bus standard). The computer accesses an individual cell 20 by broadcasting messages with a field, which identifies the intended actuator. Cells 20 are energized to manipulate various loads P within individual cells or to transfer the loads to adjacent cells to achieve global reorganization or load arrangement.

Load motion may be controlled manually or by an automated control algorithm. For example, the system may be used for teleoperation for the purposes of inspection and hazardous handling. When operating in an automatic mode, the cells 20 are controlled by a load manipulation algorithm running on a suitable computing device. In automatic mode, the load positions may be identified by an overhead imaging device 40 (shown in FIG. 4 and described below), whose frames are sent in real time to image-processing software installed on computer 42. Load contours are recovered using standard image processing algorithms, yielding traceable load position and orientation, as is well known by those skilled in the art. Automated load motion control software may be based on heuristics depending on the specific manipulation function being utilized. For example, in parcel singulation, an incoming stream of loads can be dynamically rearranged into a single-file exiting stream by speeding up the load nearest to the exit with respect to other incoming loads. Another example of a manipulation function is load reorganization for the purposes of storage or further sorted delivery.

Figure 4:
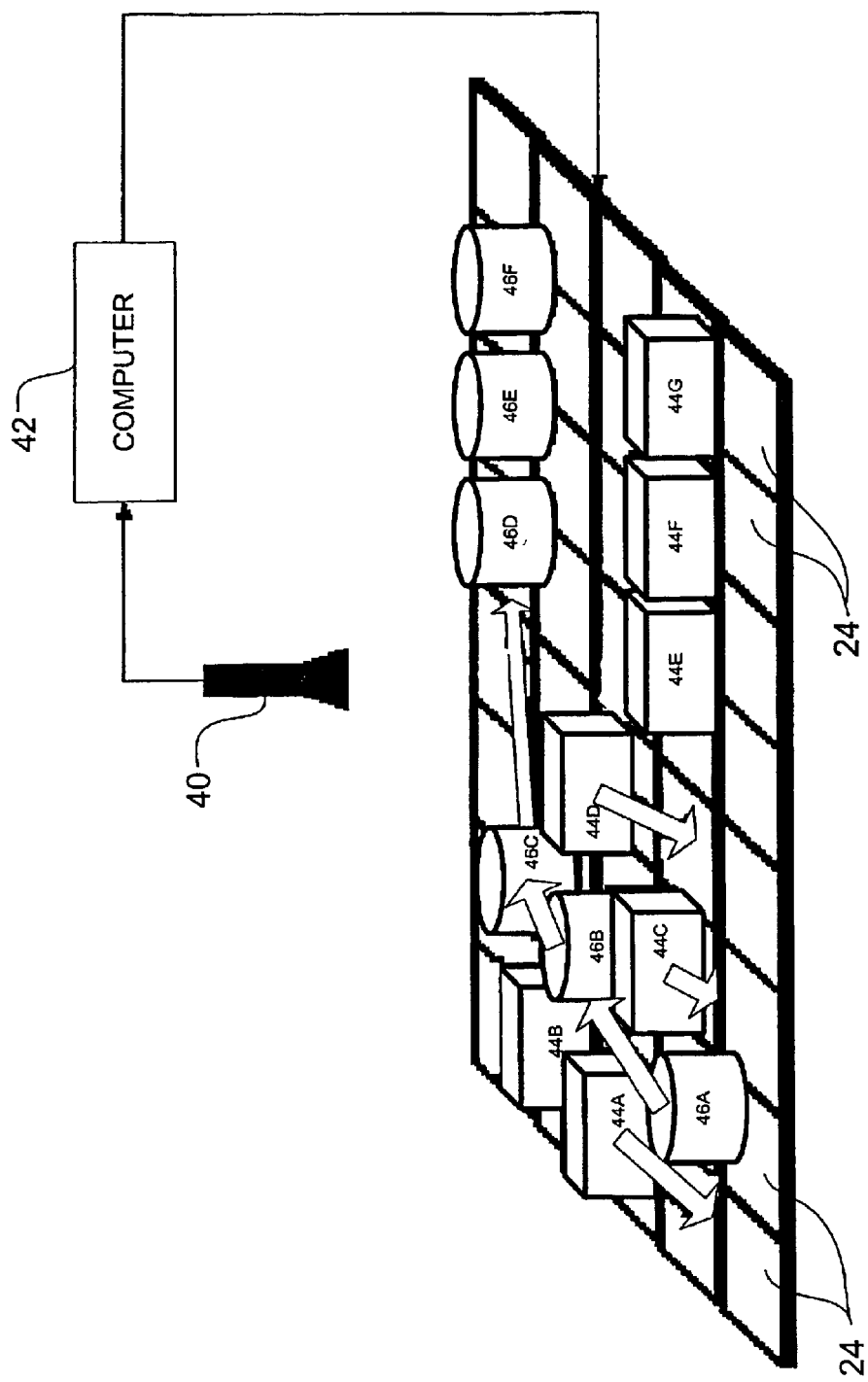
FIG. 4 is a schematic diagram illustrating sensing and controlling of load movement with the system of FIG. 3.

In a preferred embodiment, an overhead video camera 40 sends images to a computer 42 (FIG. 4). The camera 40 and computer 42 are used to identify the location of each load P positioned on the array of cells 20. The computer 42 executes algorithms of image-acquisition, load localization, and load manipulation. As shown in FIG. 4, the system may be configured to rearrange a mixed group of loads into two distinct groups, for example. The camera 40 sends images of the loads to computer 42 which distinguishes between rectangular packages 44A, 44B, 44C, 44D, 44E, 44F, 44G and cylindrical packages 46A, 46B, 46C, 46D, 46E, 46F. The computer 42 sends instructions to the cells 20 so that each of the actuators operates to move their upper vibrating surface 24 to position the loads into two separate groups (i.e., 44A–44G and 46A–46F). For example, loads 44C and 44D are moved forward (downward as viewed in FIG. 4) to line up with loads 44E, 44F, and 44G. Once loads 44C and 44D are moved to the right (as viewed in FIG. 4), loads 46A, 46B, and 46C can be moved backward and to the right to line up with loads 46D, 46E, and 46F. Load 44A is then moved forward and to the right to make room for load 44B which can then be moved forward and to the right to line up with the rest of the rectangular packages.

Referring again to FIG. 1, each cell 20 includes upper vibrating surface 24 configured to support and move load P, support base 50, four flexible legs 52 interposed between the support base and the upper surface, two actuators 34, and two transmissions 54 coupling the actuators to the upper surface. It is to be understood that the number of actuators 34 used to move the upper surface 24 in each cell 20 may be different than shown herein. For example, only one actuator 34 may be used or more than two actuators may be used as described below.

The support base 50 is preferably similar in size and shape to the upper surface 24 so that the cells 20 may be positioned adjacent to one another with only a small gap 60 therebetween (e.g., 5–10 mm) (FIGS. 1 and 2). A compressible material, such as rubber, may be placed in the gaps 60 so that the overall system is generally planar and sealed to prevent loose particles from otherwise falling inside the actuator volume. The base 50 may be formed from a material such as a medium density fiber wood, for example. The flexible legs 52 may be formed from a material such as nylon rods which provide sufficient flexure to allow for in-plane, horizontal vibratory movement of the upper surface 24. The upper surface 24 is generally planar and formed from a rigid, lightweight material such as honeycomb panels. The upper surface 24 is preferably rectangular but may also be in the form of other shapes that are configured for positioning adjacent to one another or an interlocking type of arrangement, for example. The actuator 34 and transmission 54 are contained within the space between the upper surface 24 and base 50 so that the cells 20 may be positioned adjacent one another. It is to be understood that the outer contour of the cells tiles need not be a rectangular array and can be any general contour well-suited for a manipulation task at hand (e.g., the entrance of the array may contain more cells than its output so that the array is configured as a "funneling" device.

The actuator 34 is preferably a current-to-force transducer. In a preferred embodiment, the actuators 34 are subwoofer speakers or other voice-coil type actuators, such as a commercially available Audiobahn AW800X subwoofer. The actuators 34 may also be pneumatic pistons or solenoids or linear motors or revolute motors adapted to a cam, designed to convert rotation to the desired linear motion.

Figure 5:
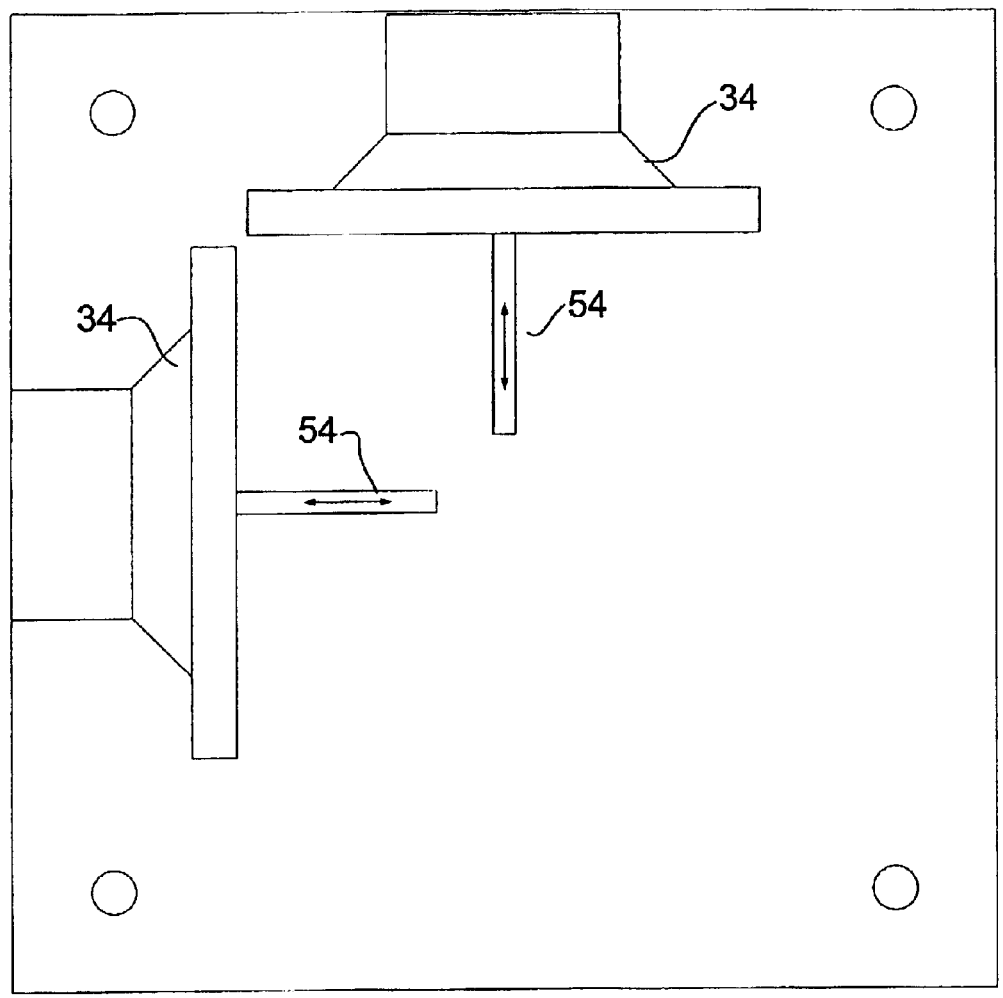
FIG. 5 is a top view of the cell of FIG. 1 with an upper vibrating surface removed to show detail.
Figure 6:
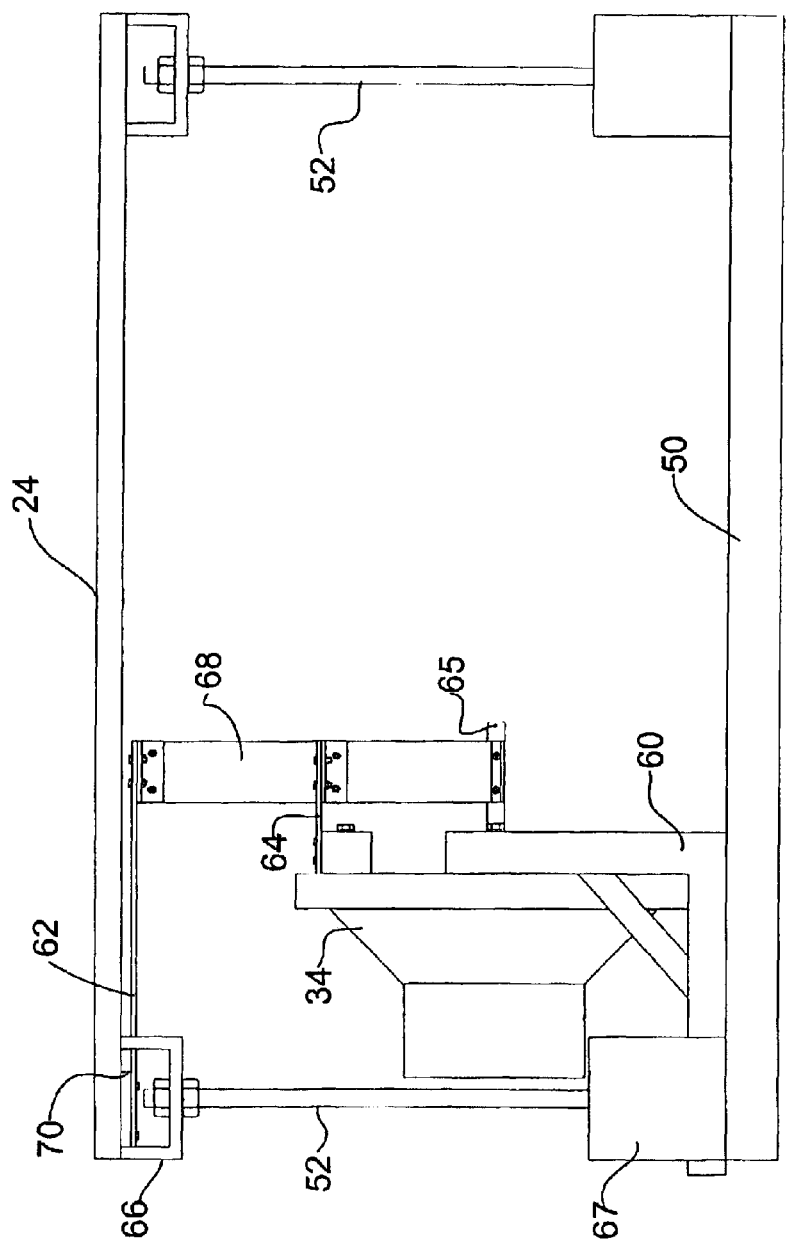
FIG. 6 is a side view of the cell of FIG. 1 with one actuator removed.
Figure 7:
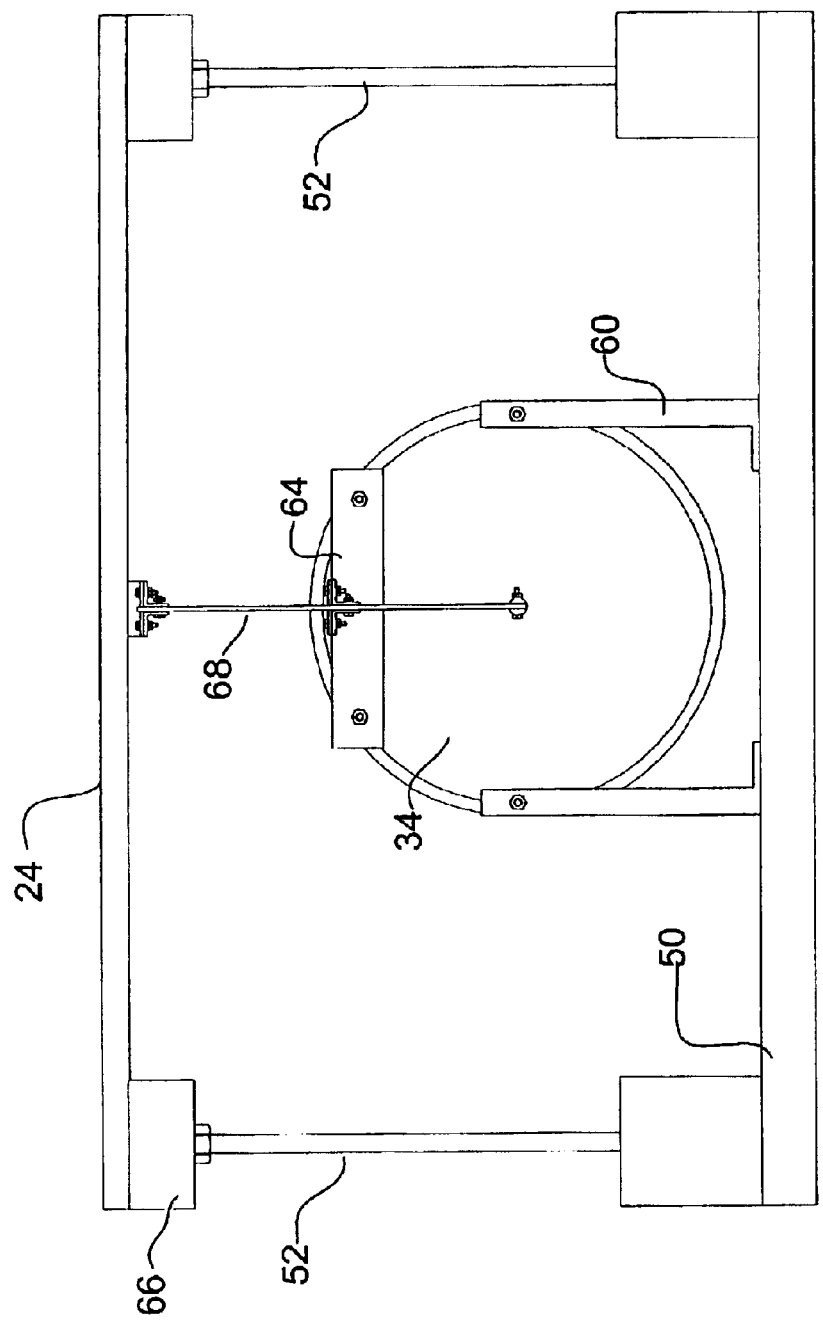
FIG. 7 is a front view of the cell of FIG. 6.

Additional details of cell 20 are shown in FIGS. 5, 6, and 7. FIG. 5 is a top view of the cell of FIG. 1 with the upper vibrating surface 24 removed to show detail. FIGS. 6 and 7 are side and front views of the cell, respectively, with one actuator 34 removed. The actuators 34 are mounted upright in the open space between the upper vibrating surface 24 and the support base 50 with rigid supports 60. Actuator (speaker) motion is transmitted to the upper surface 24 via a flexural transmission 54 which converts mid-level horizontal cone force to a symmetric force applied to the upper vibrating surface 24. Transmission 54 includes a stiff vertical beam 68 which pivots about a point on bar 64 through the bending of a small flexible strip of metal 65 (FIG. 6). Vertical beam 68 is coupled to horizontal beam 62 which transmits force to the upper surface 24. The horizontal beam 62 is attached to a pad 70 connected to the upper surface 24 along a periphery edge thereof. Transmission beams may be made of, for example, 1/32" strips of spring steel, or any other suitable shape or material beam that is designed to bend and not yield after a high number of repetitions.

The flexible legs 52 are each attached at one end to a coupling 66 which is connected to the upper surface 24. The other end of the leg 52 is mounted in a block 67 which is attached to the base 50. It is to be understood that the method of attachment of the legs 52 or the transmission 54 to the upper vibrating surface 24 may be different than shown and described herein without departing from the scope of the invention. For example, force can be transmitted directly to the upper surfaces by tilting each transducer up towards the surface, thus eliminating the pivoting flexure.

As shown in FIG. 5, one of the actuators 34 is positioned to provide force to move the upper surface 24 along an X axis located in the load manipulation plane and the other actuator is positioned to provide force to move the upper surface along a Y axis also located within the load manipulation plane.

Figure 8:
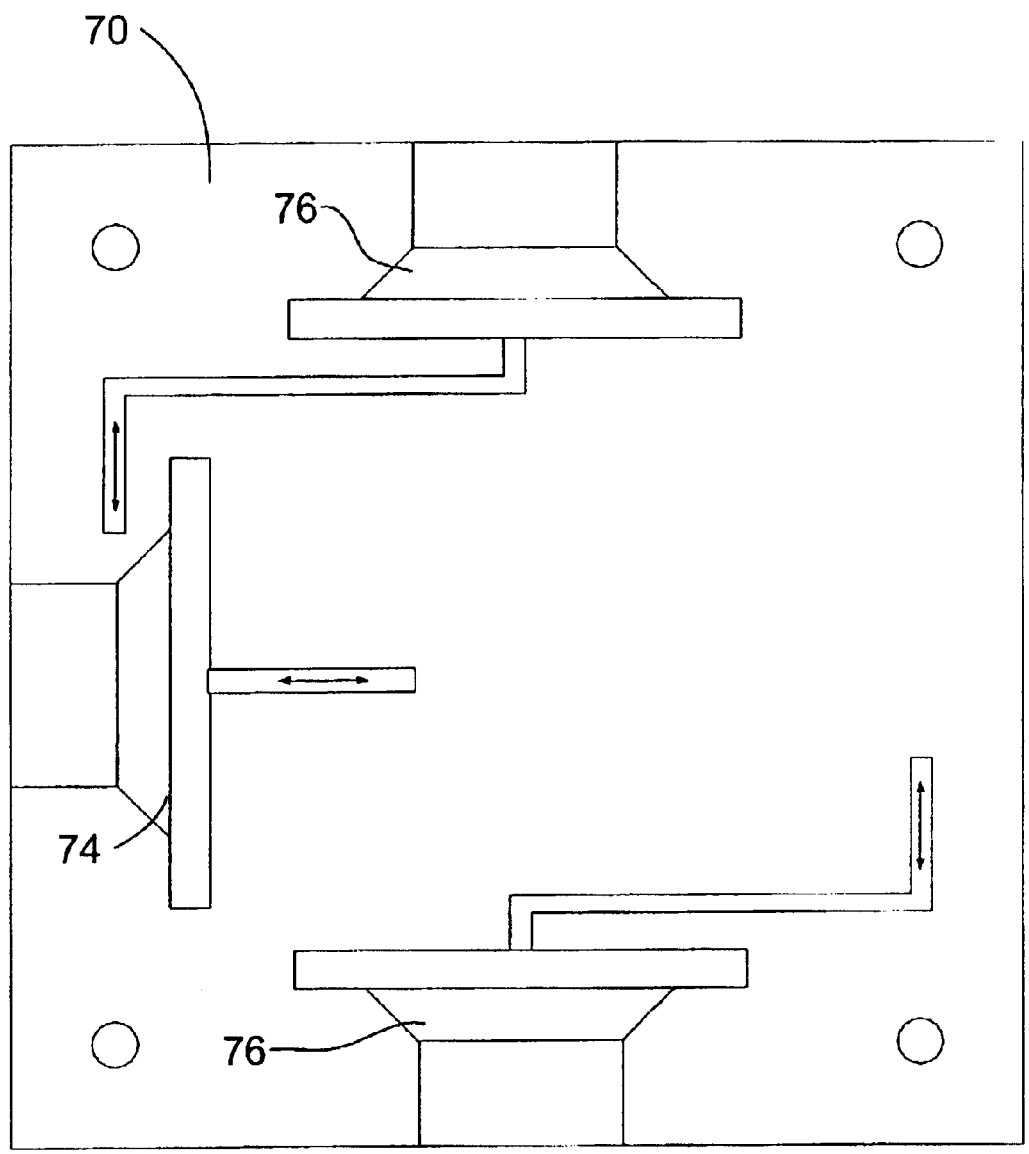
FIG. 8 is a top view of a second embodiment of the cell of FIG. 1 configured for load rotation.

FIG. 8 is a top view of a second embodiment of a cell 70 of the system of the present invention. The cell 70 includes three actuators; actuator 74 provides forces along an X axis and actuators 76 provide a combination of force along a Y axis and torque about a Z axis so that the loads can be rotated. The X and Y axes are located within the load manipulation plane.

In a preferred embodiment, each speaker is excited by an input current i(t) of the form:

$$i(t) = A[\sin(2\omega t) - \sin(\omega t)]$$

where:
  i: input current (amps)
  t: time (sec)
  A: amplitude (amps)
  ω: frequency (ω=2 πf where f is specified in Hz).
The speaker's cone moves back and forth with force proportional to i(t). This motion is transmitted to the upper vibrating surface 24 via transmission 54, whose steady state velocity is the time integral of i(t)=A[ sin (2 ωt)–sin (ωt)]:

$$v(t) = \int i(t)dt = \frac{A}{\omega}\left[\cos(\omega t) - \frac{1}{2}\cos(2\omega t)\right]$$

Figure 9:
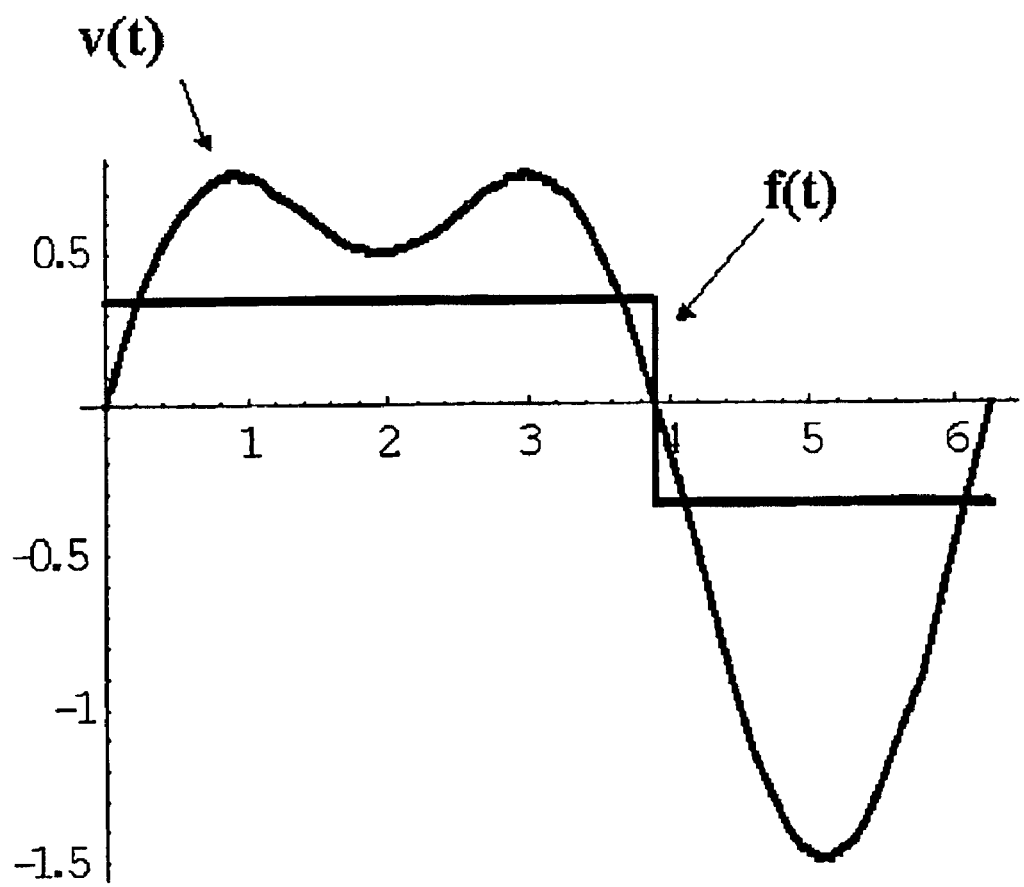
FIG. 9 is a graph illustrating a velocity profile of an actuator of the cell of FIG. 1 and instantaneous sliding friction force applied to a load by the actuator.

This waveform is shown in FIG. 9 which illustrates a velocity profile v(t) of a horizontal actuator that yields optimum load displacement velocity. FIG. 9 also includes a profile f(t) illustrating instantaneous sliding friction force applied to a supported load. Under the motion v(t), the upper surface 24 displaces supported loads P through sliding friction at a stable velocity V=A/2ω. Achievable velocities typically range from 0 to 50 cm/s. See, D. Reznik, J. Canny, "The Coulomb Pump: A Novel Parts Feeding Method using a Horizontally-Vibrating Surface", Proc. IEEE Int. Conf. on Rob. & Autom. (ICRA), Leuven, Belgium, April 1998, which is incorporated herein by reference in its entirety.

At a given frequency ω, the maximum horizontal displacement of upper vibrating surface 24 is roughly A/ω^2, which under typical operation is of about 5 to 10 mm. Typically, this requires top-surface accelerations of 8–10 g's and 100 W of power, which can be readily achieved by commercially available subwoofers such as the Audiobahn AW800X. In the first embodiment shown in FIG. 5, one or more loads are translated in tandem over an actuator's surface along an arbitrary direction and with a speed out of a realizable range. Two speakers are installed in perpendicular orientation. One speaker drives the top plate along the X axis and the other along the Y axis. Each speaker receives an amplified signal as in i(t)=A[ sin (2 ωt)–sin (ωt)], with individual amplitudes A1 and A2. The ratio A1/A2 defines in which direction a supported load will flow and with which speed. In the second embodiment shown in FIG. 8, one or more loads can be both translated and rotated over a single actuator. The three speakers are installed in perpendicular orientations. Speaker 74 drives upper surface 24 along the X axis and speakers 76 drive the surface along the Y axis and differentially about the Z axis (i.e., they can inject a torque) using off-center flexures.

Although the present invention has been described in accordance with the embodiments shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A planar load manipulation system comprising:
   a plurality of cells arranged to form a generally planar load manipulation surface, each cell comprising an actuator coupled to generally planar upper surface, the generally planar upper surfaces of the cells forming the generally planar load manipulation surface, the actuator operable to vibrate the generally planar upper surface of the cell only substantially within a plane of the load manipulation surface; and
   a controller operable to send commands to the actuators to manipulate loads on the generally planar load manipulation surface.

2. The system of claim 1 wherein the cells each have the same configuration.

3. The system of claim 1 wherein the controller comprises a manual interface.

4. The system of claim 1 wherein each of said plurality of cells comprises two actuators configured to drive the generally planar upper surface along two perpendicular axex located within the plane of the generally planar load manipulation surface.

5. The system of claim 1 wherein each of said plurality of cells comprises three actuators configured to apply a force to the upper vibrating surface along two perpendicular axes located within the plane of the load manipulation surface and apply torque such that the system can rotate loads.

6. The system of claim 1 wherein the generally planar load manipulation surface is positioned horizontally.

7. The system of claim 1 wherein the generally generally planar upper surface is formed from a honeycomb material.

8. The system of claim 1 wherein the actuator is disposed below the generally planar upper surface of the cell.

9. The system of claim 8 wherein the cell is generally rectangular in shape as viewed along an axis extending perpendicular to the generally planar upper surface and the actuator is contained within the area of the rectangle.

10. The system of claim 1 further comprising a sensor operable to sense positions of loads on the generally planar load manipulation surface, the controller configured to receive input from the sensor.

11. The system of claim 10 wherein the sensor comprises a camera and an image processing system.

12. The system of claim 10 wherein the sensor comprises a pressure sensitive transducer.

13. The system of claim 1 wherein the actuator comprises at least one current-to-force transducer.

14. The system of claim 13 wherein the transducer is a voice coil.

15. The system of claim 13 wherein the transducer is a speaker.

16. The system of claim 15 wherein the speaker is excited by an input current of the form i(t) ×A[2wt] and the generally planar upper surfaces vibrating move at a velocity corresponding to the waveform.

$$v(t) = \int i(t)dt = \frac{A}{\omega}\left[\cos(\omega t) - \frac{1}{2}\cos(2\omega t)\right].$$

17. The system of claim 1, wherein the cell comprises a flexure transmission arranged to transfer energy from the actuatory to the generally planar upper surface.

18. The system of claim 17 wherein the flexure transmission comprises a flexible member arranged to receive input from the actuator and a mechanism coupled to the flexible member and generally planar upper surface.

19. The system of claim 17 wherein the actuators are coupled directly to the generally planar upper surface through angled transmission axes.

20. The system of claim 1 wherein the generally planar upper surface is coupled to a support base by a plurality of flexible legs.

21. The system of claim 20 wherein the legs are formed from nylon.

22. The system of claim 20 wherein the actuator is interposed between the support base and generally planar upper surface.

23. The system of claim 1 wherein the cells are positioned generally adjacent to one another.

24. The system of claim 23 wherein the cells are positioned such that the upper vibrating surfaces are disposed within 10 mm of one another while in a stationary position.

25. The system of claim 24 wherein gaps between adjacent upper surfaces are filled with a compressible material.

26. The system of claim 25 wherein the compressible material is rubber.

27. A planar load manipulation system comprising a plurality of cells each having an upper planar surface, the cells arranged to form a planar load manipulation surface, each cell comprising an actuator coupled to the upper surface of the cell and operable to vibrate the upper surface within a plane of the load manipulation surface, the actuator comprising at least one current-to-force transducer.

28. The system of claim 27 wherein the transducer is a voice coil.

29. The system of claim 27 wherein the transducer is a speaker.

30. The system of claim 27 wherein each of said plurality of cells comprises two actuators configured to drive the upper vibrating surface along two perpendicular axes located within the plane of the load manipulation surface.

31. The system of claim 27 wherein gaps between adjacent upper surfaces are filled with a compressible material.

32. The system of claim 27 wherein the load manipulation surface is positioned horizontally.

33. The system of claim 27 further comprising a controller operable to receive input from a sensor configured for sensing positions of loads disposed on the load manipulation surface and sending instructions to each of the actuators of said plurality of cells to vibrate the upper surfaces and manipulate the loads disposed thereon.

* * * * *